United States Patent
Baisley

Patent Number: 6,129,460
Date of Patent: Oct. 10, 2000

[54] OBJECT-ORIENTED APPARATUS AND METHOD IN A COMPUTER SYSTEM FOR A PROGRAMMING LANGUAGE COMPILER TO SELECT OPTIMAL POINTER KINDS FOR CODE GENERATION

[75] Inventor: Donald Edward Baisley, Laguna Hills, Calif.

[73] Assignee: Unisys Corp., Bluebell, Pa.

[21] Appl. No.: 08/992,825

[22] Filed: Dec. 17, 1997

[51] Int. Cl.$^7$ .................................................. G06F 9/45
[52] U.S. Cl. ................. 395/709; 717/8; 717/10
[58] Field of Search ................................. 395/703, 704, 395/707, 709, 705; 707/206, 103

[56] References Cited

U.S. PATENT DOCUMENTS

| | | | |
|---|---|---|---|
| 4,667,290 | 5/1987 | Goss et al. ............................... | 395/707 |
| 5,210,760 | 5/1993 | Bentley et al. .......................... | 714/761 |
| 5,412,797 | 5/1995 | Rubin ...................................... | 709/303 |
| 5,481,708 | 1/1996 | Kukol ...................................... | 395/700 |
| 5,535,391 | 7/1996 | Hejlsberg et al. ...................... | 395/709 |
| 5,551,029 | 8/1996 | Jagadish et al. ........................ | 707/103 |
| 5,644,709 | 7/1997 | Austin ................................ | 395/185.06 |
| 5,740,443 | 4/1998 | Carini ..................................... | 395/705 |
| 5,790,866 | 8/1998 | Robinson ............................... | 395/709 |
| 5,848,423 | 12/1998 | Ebrahim et al. ........................ | 707/206 |

OTHER PUBLICATIONS

Agrawal et al, "Dynamic slicing in the presence of unconstrained pointers", ACM pp. 60–73, 1991.

Debray, "Abstract interpretation and low level code optimization", PEPM ACM, pp. 111–121, 1995.

Holt, "Data descriptors: a compile time model of data and addressing", ACM Trans. Prog. Lang. & Sys. vol. 9, No. 3, pp. 367–389, Jul. 1987.

Hummel et al, "Abstract description of pointer data structure: an approcah for improving the analysis and optimization of imperative programs", ACM letters on Prog. Lang. & Sys. vol. 1, No. 3, pp. 243–260, Sep. 1992.

Odersky, "Programming with variable functions", ICFP ACM, pp. 105–116, 1998.

Dolby et al, "An evaluation of automatic object inline allocation techniques", OOPSLA ACM, pp. 1–20, Oct. 1998.

Austin et al., "Efficient detection of all pointer and array access errors", SIGPLAN, ACM, pp. 290–301, Jun. 1994.

*Primary Examiner*—Tariq R. Hafiz
*Assistant Examiner*—Anil Khatri
*Attorney, Agent, or Firm*—J. Ronald Richebourg; Mark T. Starr; Steven B. Samuels

[57] ABSTRACT

The invention disclosed is an object-oriented apparatus and method in a computer system for a programming language compiler to select optimal pointer kinds for code generation. The invention offers important advantages over current compiler practice. In Particular, the invention provides improved performance for compiled programs through generation of more optimal selection of pointer kinds and variable allocations. Also, the invention provides a general framework for optimizing pointer usage, as opposed to leaving such optimization to special cases.

27 Claims, 11 Drawing Sheets

OBJECT-ORIENTED APPARATUS AND METHOD IN A COMPUTER SYSTEM FOR A PROGRAMMING LANGUAGE COMPILER TO SELECT OPTIMAL POINTER KINDS FOR CODE GENERATION

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The invention relates generally to the field of compiling source programs into binary programs for execution on computer systems and more particularly to code optimization performed by a compiler.

BACKGROUND OF THE INVENTION

A programming language compiler is a computer program that reads source files to produce a binary file. The source files describe the program using a computer language such as C, C++, COBOL and so on. The binary file produced by the compiler contains a series of binary machine instructions for some particular type of computer called the target computer.

The machine instructions generated by a compiler access the target computer's memory and registers using various kinds of pointers. The kinds of pointers that can be used vary between the different kinds of computer processors. The kind of pointer used for an operation can affect performance, where the pointer can be stored and where the pointer can point. By affecting where the pointer can point, pointer kinds affect variable allocation, which further affects program performance.

Prior art compilers have varying degrees of success at choosing pointer kinds. Variables are sometimes allocated based on types of pointers required, but changes to the use of variables caused by typical optimizations such as inlining and dead code elimination are generally ignored, so variable allocations do not take advantage of changes in pointer requirements. The lost potential advantages from inlining can be significant when pointers are passed as arguments or returned as results. Also, global variables are generally assumed to have worst-case pointer requirements. Prior art optimizations of pointer kinds tend to be handled as special cases. There is a need for a general mechanism for compilers to use for choosing the best pointer kinds that take advantage of other optimizations like inlining, which leads to the efficient allocation of both global and local variables.

SUMMARY OF THE INVENTION

The present invention is an object-oriented apparatus in a computer system for a programming language compiler and is disposed for selecting optimal pointer kinds for code generation. The apparatus includes a first type that represents a set of pointer kinds, which has an operation for returning all pointer kinds that can be created from the set of pointer kinds. The apparatus also includes a second type that represents a variable in a program being compiled; and, a base type of objects representing expressions.

Also, the present invention includes a method in a computer system for selecting optimal pointer kinds for code generation in a compiler. The method comprises the steps of parsing a program language in order to create variable objects and expression objects; reducing each whole expression; determining storage allocation for variable objects based on kinds of pointers used; reducing each whole expression causing all pointer kinds to become known; and, generating machine instructions based on known kinds and allocations.

The present invention provides an object-oriented apparatus and method for a compiler to select the optimal kind of pointer for each pointer used.

The present invention offers important advantages over current compiler practice. Specifically, the invention provides improved performance for compiled programs through generation of more optimal selection of pointer kinds and variable allocations. Also, the invention provides a general framework for optimizing pointer usage, as opposed to leaving such optimization to special cases. This invention contributes substantially to optimization in a new compiler producing machine code running 1.5 to 2 times faster than code from a prior art compiler, despite substantial optimization performed by the prior art compiler.

Moreover, the present invention provides improved performance by effectively taking advantage of other optimizations such as inlining and dead code elimination.

Still other objects, features and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims.

DETAILED DESCRIPTION OF ONE EMBODIMENT

Figure 1:
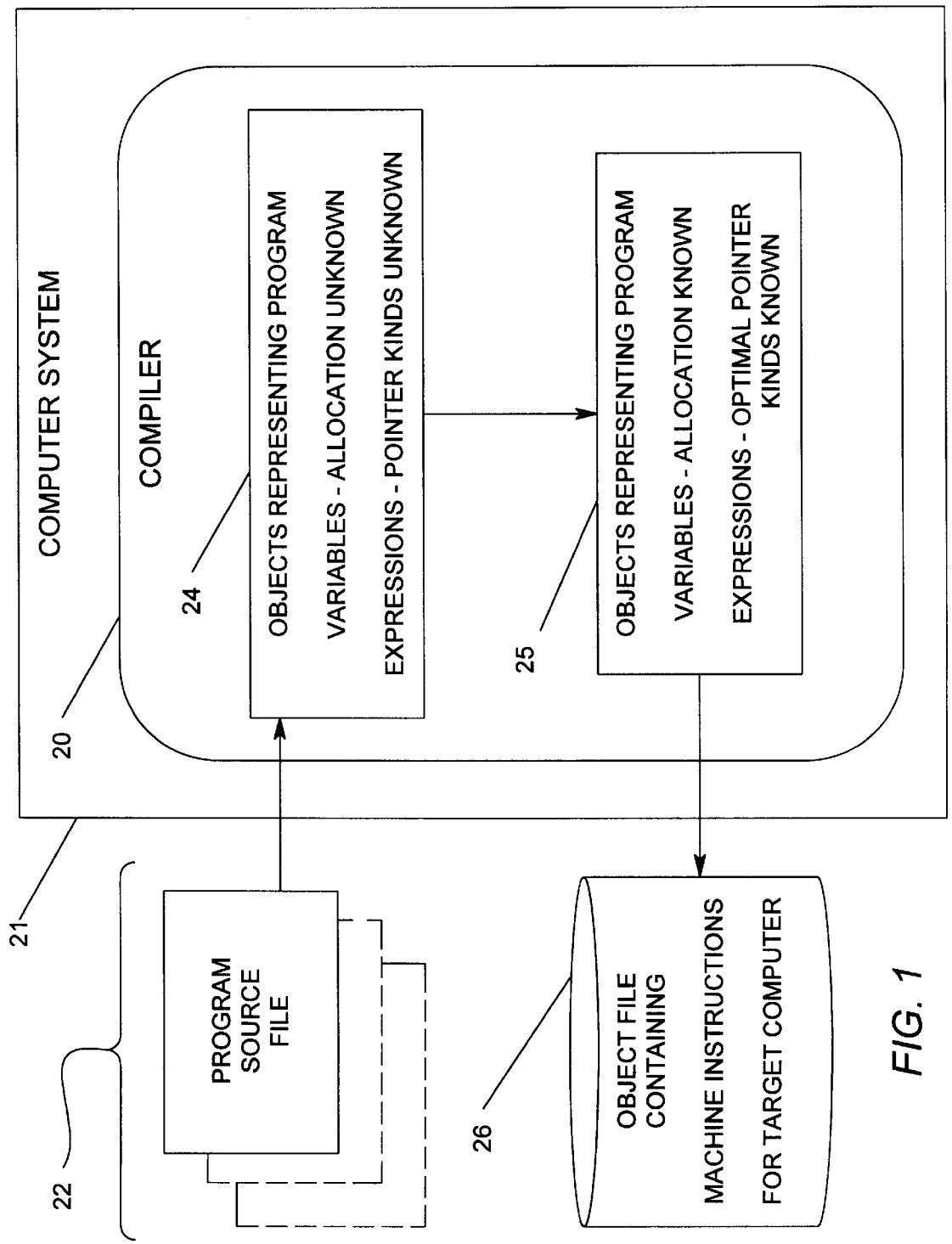
FIG. 1 is a block diagram illustrating the flow of information through a compiler running in a computer system, from source files to machine instructions for storage in a binary file.

A background of object oriented programming concepts and related definitions, which are helpful in understanding the apparatus and method described herein, are set forth hereinbelow:

Object-oriented programming is defined as a method of implementation in which programs are organized as cooperative collections of objects, each of which represents an instance of some type. See a text entitled *Object-Oriented Analysis and Design,* by Grady Booch, 1994.

An object is an abstract representation of a real-world concept or thing—such as a person, a software package, or an event. In the computer system memory, the state of an object is represented by the values of instance variables defined for the object's type. For example, the state of a person object might be name, birth date, spouse, etc.

The behavior of an object is the set of operations that the object can perform. In the computer system, the behavior of an object is represented by the operations defined for the object's type.

Objects in the memory of a computer system represent real-world or conceptual entities. An object occupies a portion of memory which contains named instance variables for storing information about the entity. An object also provides operations that can be performed by the computer processor for accessing and modifying the information.

As a background several definitions are set forth as follows:

Types

A type is a template that describes the instance variables and operations that an object possesses. A type defines a pattern that can be used to create or identify objects; it does not contain the actual object. A type can also be a base for other types.

Objects described by a type are called instances of that type. Types derived from a base type are called subtypes of that type. A type that is used to define only other types and not objects is said to be abstract.

The definition of a subtype identifies the base types from which it is derived. A type cannot be a subtype of itself. A subtype inherits all the instance variables and operations of its base types. It can be customized by adding new instance variables and operations. For example, a type called Manager defined as a subtype of Employee would inherit all the instance variables and operations of Employee and would define additional instance variables and operations of its own. An object of type Manager would then have all the instance variables defined by the Employee and Manager types, and would have all the operations defined by both types.

Instance Variables

The memory used by an object contains instance variables. Each instance variable has a type, which defines the range of values that can be stored in the variable.

Operations

An operation is a feature that represents a behavior that objects possess. The operations defined for a type form an interface that can be seen by users of objects of that type. An operation can have parameters that identify information a caller must provide when invoking the operation. If an operation has no parameters, a caller merely invokes the operation for the desired object.

Methods

Each operation must be implemented by a module of code called a method. A method is the steps performed to complete an operation.

Referring now to FIG. 1 a block diagram illustrates the flow of information through a programming language compiler 20 running in a computer system 21. The compiler 20 is a computer program that reads source files 22 to produce a binary file. The source files 22 describe the program using a computer language such as C, C++, COBOL and so on. The binary file 36 produced by the compiler contains a series of binary machine instructions for some particular type of computer, called the target computer. One or more source files 22 are provided as an input to the compiler 20 whereupon they are scanned and parsed by the compiler to generate objects representing program elements, such as variables and expressions (block 24). Initially, the allocation of variables and the pointer kinds of expressions are unknown. These objects are then converted by the compiler to objects representing the program such that variable allocations and optimal pointer kinds are known (block 25). The converted objects are then translated by the compiler to machine instructions for the target computer and stored in a binary file 26.

The machine instructions generated by the compiler 20 access the target computer's memory and registers using various kinds of pointers. The kinds of pointers that can be used vary among computer processors. The kind of pointer used for an operation can affect performance, where the pointer can be stored and where the pointer can point. By affecting where the pointer can point, pointer kinds affect variable allocation, which further affects program performance. Hence, the determination of optimal pointer kinds and variable allocations in the conversion of compiler objects from a first stage depicted by the block 24 to a second stage depicted by the block 25 is important for producing fast program performance.

The following types are used by this invention:

1. A set type, Kind, holds a set of enumerated pointer kinds. These operations are supported for a Kind:
   a. kindCastableFrom returns a Kind set that can be created from kinds in this Kind set;
   b. kindCastableTo returns a Kind set from which kinds in this Kind set can be created. This is the inverse of kindCastableFrom; and,
   c. bestKind returns the one kind from this Kind set that generally provides the best performance.
2. An object type, Var, identifies a variable in a program being compiled. Besides information about the variable given by the program such as its name, type, and storage class, a Var object has instance variables to hold a counter for the number of times the variable's value is accessed and additional counters for the number of times pointers to the variable are constructed—one counter for each set of kinds that requires a different allocation of the variable. A Var object supports the following operations:
   a. construction, which sets counters to zero; and,
   b. allocate, which determines the allocation of storage for the variable.
3. An abstract type, Exp, is the base type of objects representing expressions. In this invention, the following instance variables are defined for the Exp type:
   a. myKind of type Kind;
   b. myKindIsTaken of Boolean type; and,
   c. myKindIsGiven of Boolean type.

This invention further defines these operations for each Exp object that yields a pointer:
   a. construction sets myKind to include all kinds and sets myKindIsTaken and myKindIsGiven to FALSE.

b. kind returns the current Kind being considered for the expression, which is the value of myKind.

c. takeKind tells an Exp object the pointer kinds that are acceptable. There are two arguments, a Kind and a Boolean argument called isTaken indicating whether the Kind argument represents kinds that are all known to be acceptable. (See FIGS. 4A and 4B for the method of this operation.)

d. giveKind is used to indicate what pointer kinds can be given by an expression. There are two arguments, a Kind and a Boolean argument called isGiven indicating whether the Kind argument represents kinds that are all known to be produceable. See FIG. 5 for the method of this operation.

e. kindIsTaken indicates whether the expression's current pointer kind is taken. It returns myKindIsTaken.

f. kindIsGiven indicates whether the expression's current pointer kind is given. It returns myKindIsGiven.

g. kindIsKnown indicates whether the expression's current pointer kind is known, meaning it is a single kind that is both taken and given. It returns TRUE if myKindIsTaken and myKindIsGiven are both TRUE; otherwise it returns FALSE.

h. reduce calls takeKind and reduce on any pointer subexpressions, and calls giveKind in response to any previous takeKind. The method of this operation is specific to each subtype of Exp.

4. An object type KindCast, is a subtype of Exp. A KindCast object has a pointer subexpression. The code generated for a KindCast converts a pointer provided by the subexpression into the kind of the KindCast. A KindCast object is inserted in places where an Exp object does not give a kind that is taken. The following methods are defined:

a. takeKind is defined differently for KindCast than for other Exp objects. (See FIGS. 6A and 6B.)
   b. reduce also has a specific method for KindCast. (See FIG. 7.)

5. An object type, VarValue, a subtype of Exp, identifies a variable and represents an expression which obtains the variable's value. The following methods are defined:

a. construction: add one to the corresponding Var object's myVarValue.
   b. destruction: subtract one from the corresponding Var object's myVarValue.
   c. reduce: if the variable has a pointer type, call giveKind passing the supported pointer kinds for the variable and TRUE.

6. An object type, VarPtr, a subtype of Exp, identifies a variable and represents an expression that yields a pointer to the variable. A VarPtr object supports an operation, chgPtrCnt, in addition to the operations defined for Exp. The operation chgPtrCnt takes an integer argument and adjusts a counter in the corresponding Var object by the amount of the argument. Which counter is adjusted depends on the values of myKind and myKindIsTaken. The following methods are defined for VarPtr:

a. construction: call chgPtrCnt passing 1.
   b. destruction: call chgPtrCnt passing −1.
   c. takeKind: (See FIG. 8.)
   d. giveKind: (See FIG. 9.)
   f. reduce: Call giveKind. If the variable has been allocated, pass all kinds supported for the type of allocation as the first argument and TRUE as the second argument; otherwise, pass all kinds supported for the variable's type as the first argument and FALSE as the second argument.

Other subtypes of Exp represent the various expression operators, function calls and constants. There can be any number of subtypes of Exp, depending on the language being compiled. The reduce method of each subtype that has a pointer subexpression must call takeKind and reduce on the subexpression. The reduce method of each subtype that yields a pointer must call giveKind.

Figure 2:
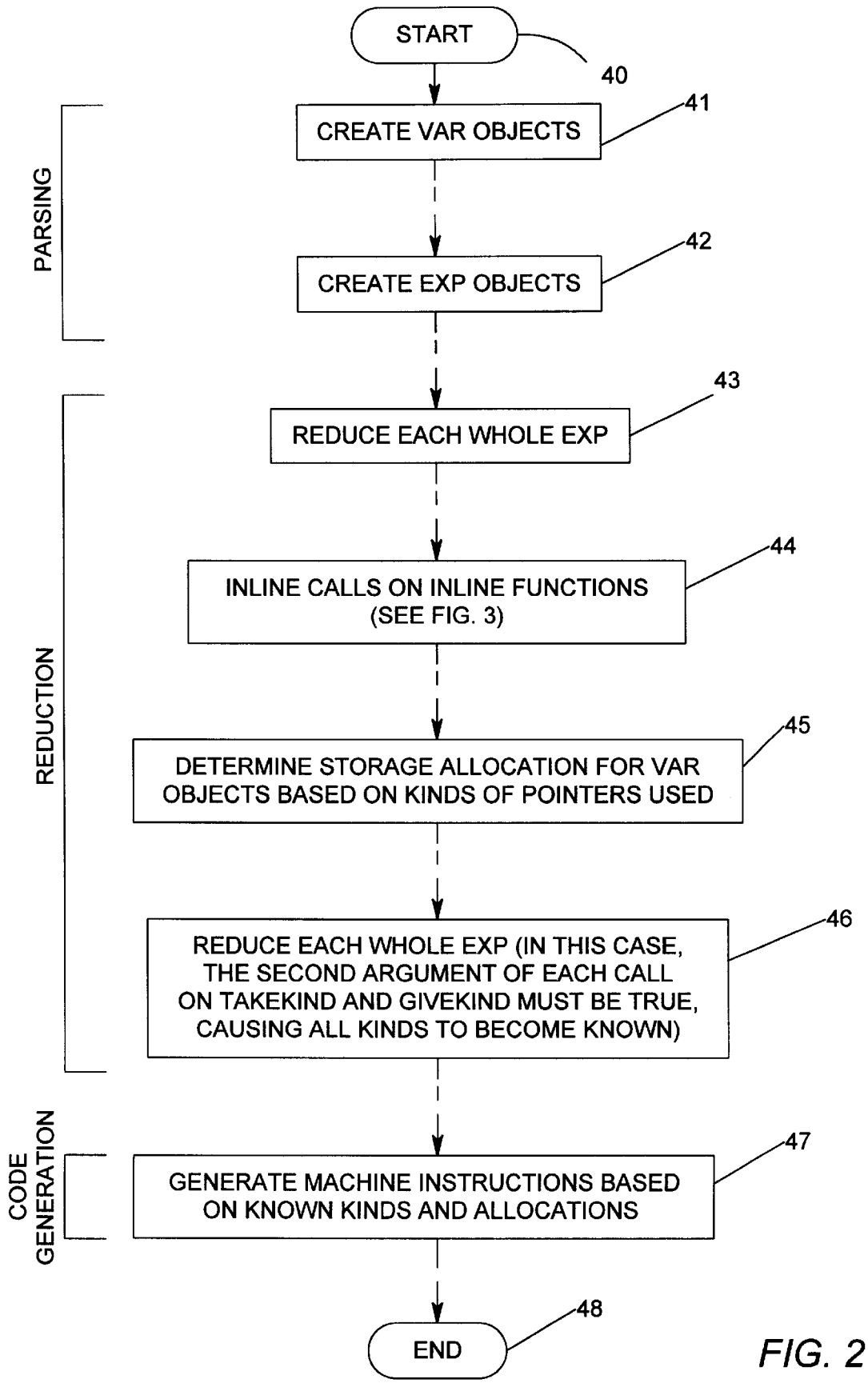
FIG. 2 is an overall flow chart illustrating the process of the present invention.

Referring now to FIG. 2, an overall flow chart illustrates the process of the present invention. The process begins with a start bubble 40 followed by a step of creating Var objects for the variables declared in the program being compiled (block 41). Next, Exp objects are created for each expression in the program (block 42). Each Exp object has a subtype that corresponds to the expression operation it represents. Any Exp object with subtypes VarValue and VarPtr use the constructions explained above so that they are counted for each Var. Blocks 41 and 42 generally occur during a compiler's parsing step.

Following this, each whole expression (Exp) is reduced (block 43). This is the first pass of reductions over the program. The takeKind operation is performed on each pointer expression before it is reduced. In this way, each use of a pointer determines the pointer kinds that can be used. As part of the reduction of each Exp object yielding a pointer, giveKind is called to identify what pointer kinds can be provided by the expression. The resulting change in kind of any VarPtr is reflected in the corresponding Var objects' counters, as described in the VarPtr methods above. After the first pass of reductions, any inlining of functions is performed (block 44), which step is further illustrated in FIG. 3.

Storage allocation for variables is determined based upon the kinds of pointers used (block 45). The allocate operation is used to determine allocation for each Var object. The allocate operation considers a Var object's counters to determine whether allocation is needed and the type of memory to allocate.

Next, each whole expression is reduced (block 46). In this case, all calls on takeKind must indicate kinds are taken by passing TRUE as the second argument. Because all allocations have been made, each call on giveKind can and must indicate kinds are given by passing TRUE as the second argument. This reduction pass causes all kinds to become known. The blocks 43 through 46 generally occur during a compiler's process of reduction.

Finally, machine instruction are generated (block 47) from objects representing the program using the Var allocations determined in block 45 and the pointer kinds determined in block 46. The process illustrated in FIG. 2 is then concluded with an end bubble 48.

Figure 3:
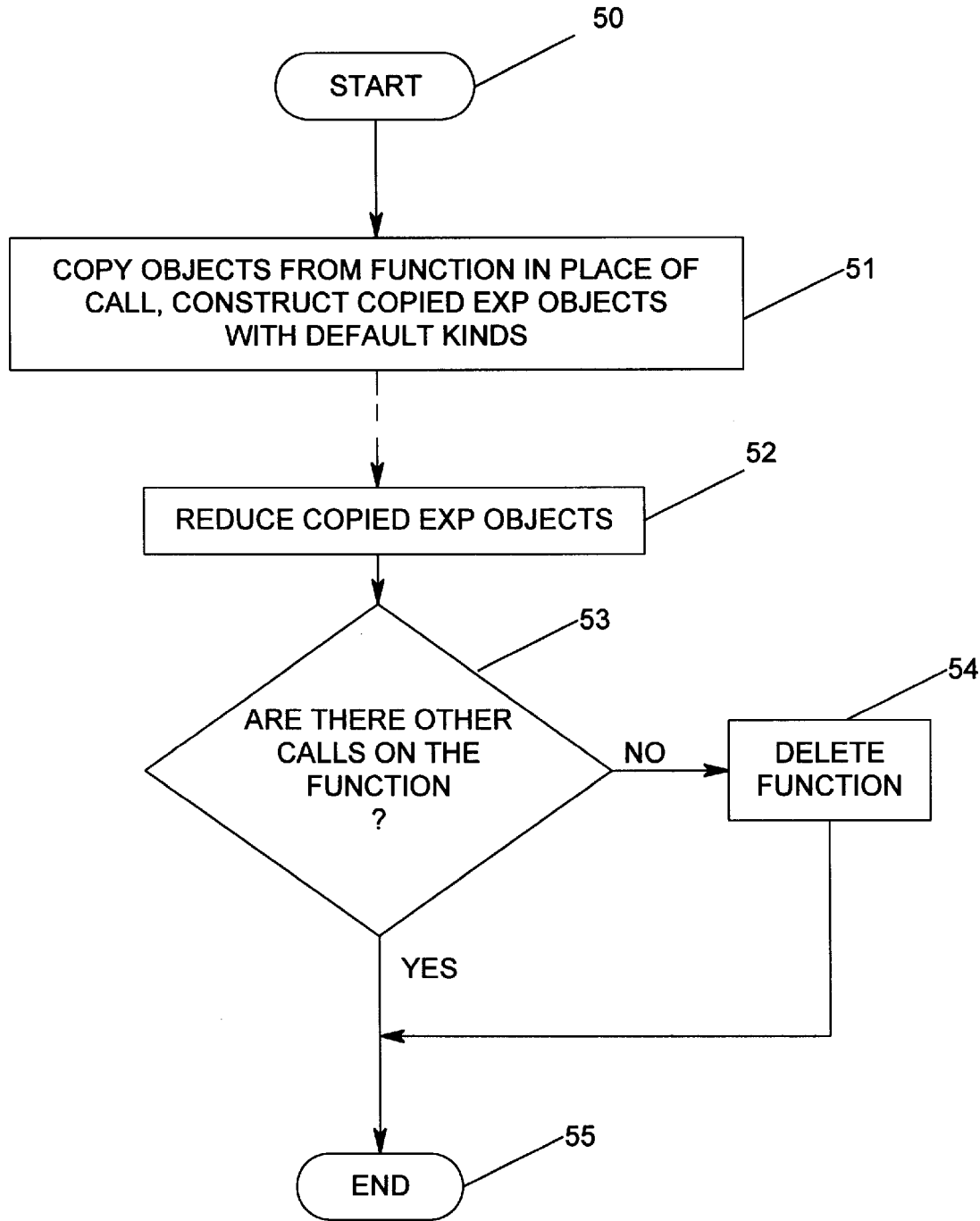
FIG. 3 is a flow chart illustrating inlining of a function call.

Referring now to FIG. 3, a flow chart illustrates the process for inlining a call. The process begins with a start bubble 50 followed by a step of copying objects representing a function being inlined into the place of a call on the function (block 51). Copies of Exp objects are constructed with default kinds without regard to the kind information in the objects being copied. Next, the copied objects are reduced (block 52). Following this, an inquiry is made as to whether or not there are other calls on the function being inlined (diamond 53). If the answer to this inquiry is no, then the function is deleted (block 54). When a function is deleted, the expressions it contains are also deleted. Deletion of any VarValue and VarPtr objects is reflected in the corresponding Var objects' counters. Finally, the process is ended (bubble 55).

Figure 4A:
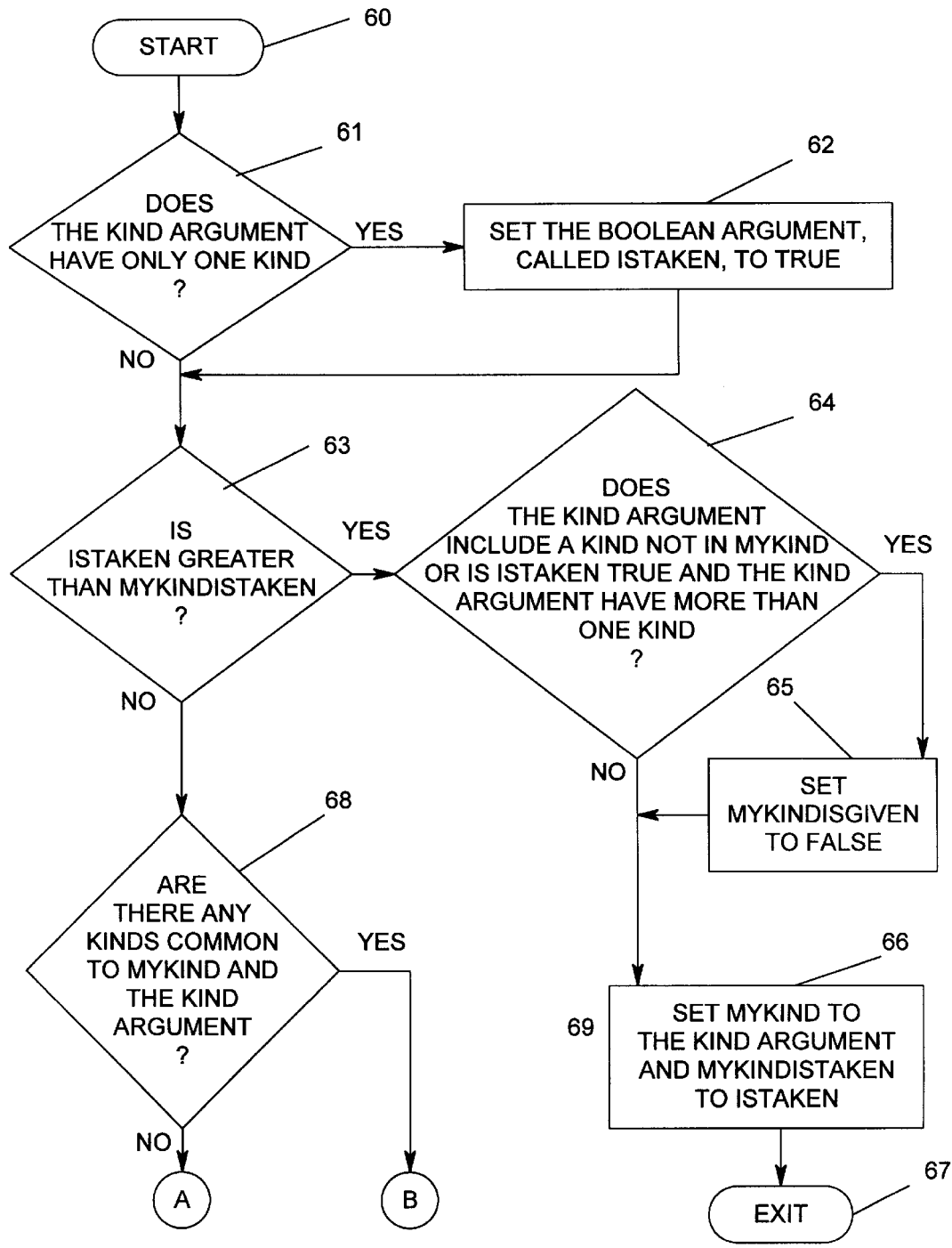
FIGS. 4A and 4B combined form a flow chart of the method of the giveKind operation generally used by an Exp object.
Figure 4B:
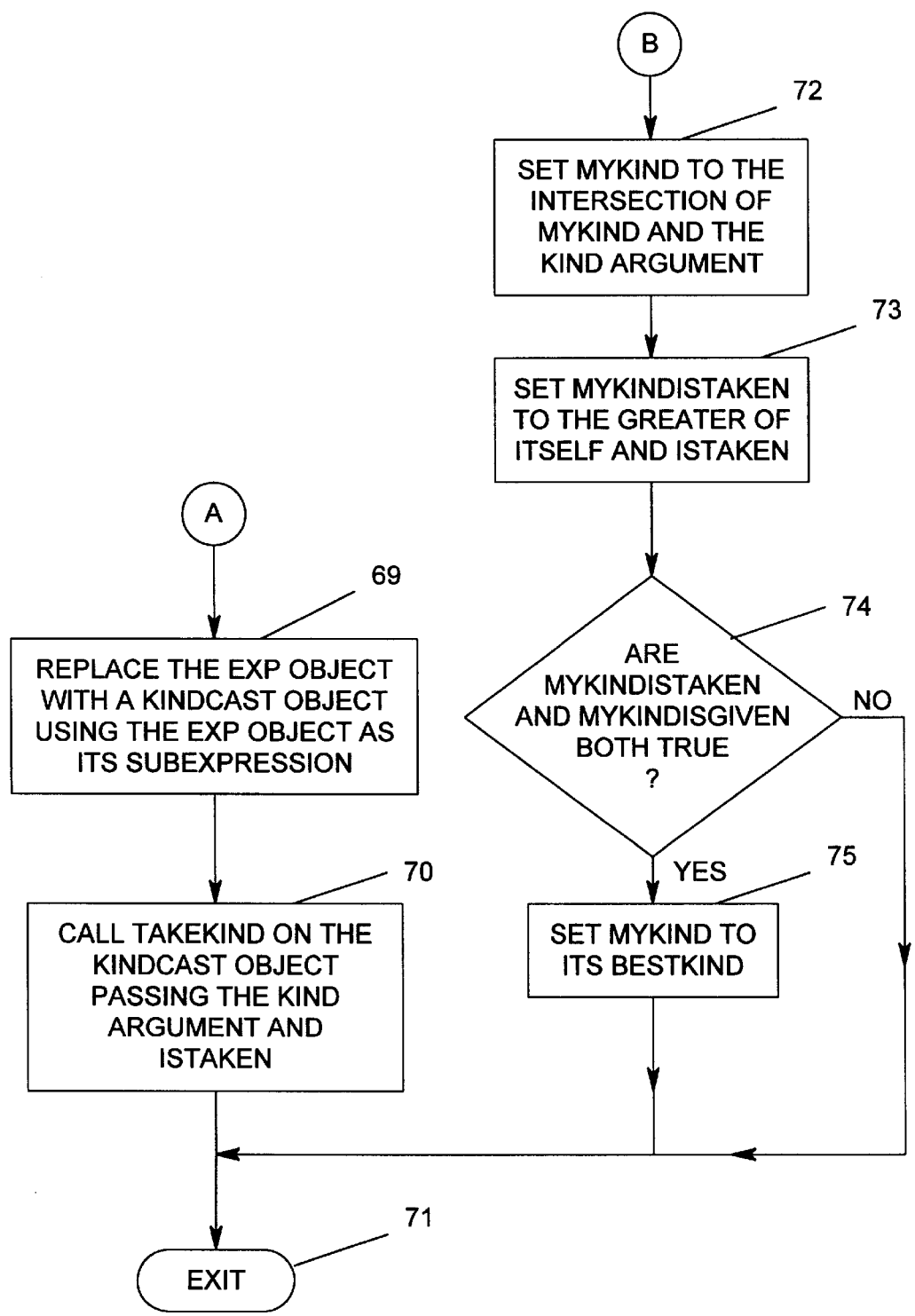

Referring now to FIGS. 4A and 4B, a flow chart is shown which illustrates the method of the takeKind operation generally used by an Exp object. The process begins with a start bubble 60 followed by an inquiry as to whether or not the Kind argument has only one kind (diamond 61). If the answer to this inquiry is yes, then the Boolean argument called IsTaken is set to TRUE (block 62). Then, whether the answer to diamond 61 is yes or no, another inquiry is made as to whether or not IsTaken is greater than myKindIsTaken (diamond 63). If the answer to this inquiry is yes, then yet another inquiry is made as to whether or not the Kind argument includes a kind not in myKind or whether IsTaken is TRUE and the Kind argument has more than one kind (diamond 64). If the answer to this inquiry is yes, then myKindIsGiven is set to FALSE (block 65). Then, whether the answer is yes or no, myKind is set to the Kind argument and myKindIsTaken is set to IsTaken (block 66). Following this, the process is exited (bubble 67).

If the answer to the inquiry in the diamond 63 is no, another inquiry is made as to whether or not there are any kinds common to myKind and the Kind argument (diamond 68). If the answer to this inquiry is no then the process illustration continues on the next sheet of the drawings in FIG. 4B as denoted by a connector A. Likewise, if the answer to the inquiry in the diamond 68 is yes, then the process illustration continues at a connector B in FIG. 4B.

Referring now to FIG. 4B at the connector A, the Exp object is replaced with a KindCast object using the Exp object as its subexpression (block 69). Next, the KindCast object's takeKind operation is called passing the Kind argument and IsTaken (block 70). Following this, the process is exited (bubble 71). Referring back to the connector B, myKind is set to the intersection of myKind and the Kind argument (block 72). Next, myKindIsTaken is set to the greater of itself and IsTaken (block 73). Following this, another inquiry is made as to whether or not myKindIsTaken and myKindIsGiven are both TRUE (diamond 74). If the answer to this inquiry is no then the process is exited (bubble 71). On the other hand, if the answer is yes, then myKind is set to bestKind (block 75) and the process is exited (bubble 71).

Figure 5:
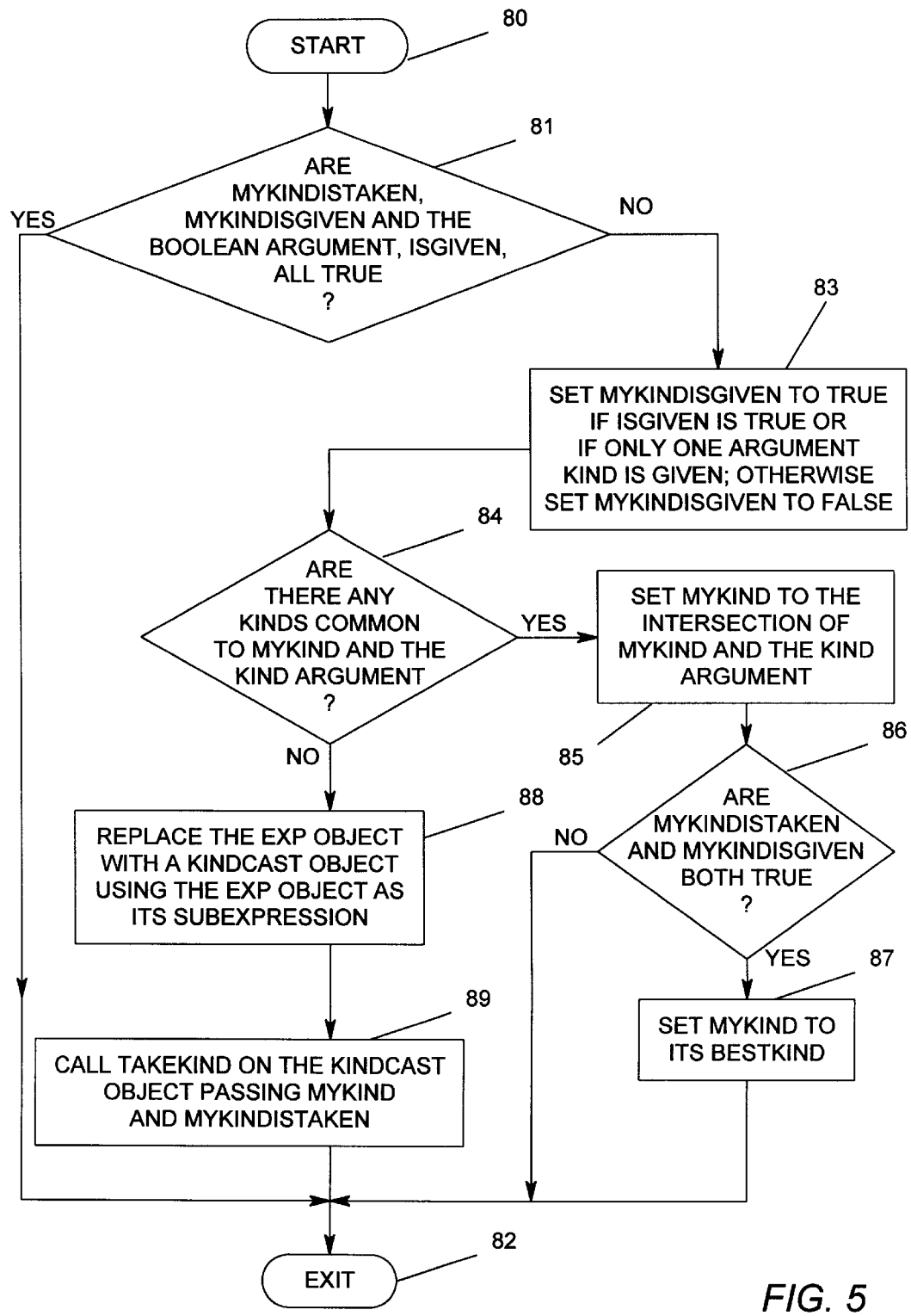
FIG. 5 is a flow chart illustrating the method of the giveKind operation generally used by an Exp object.

Referring now to FIG. 5, a flow chart illustrates the method of the giveKind operation generally used by an Exp object. The process begins with a start bubble 80 followed by an inquiry as to whether or not myKindIsTaken, myKindIsGiven and the Boolean argument, isGiven, are all TRUE (diamond 81). If the answer to this inquiry is yes, then the process is exited (bubble 82). On the other hand, if the answer to this inquiry is no, then myKindIsGiven is set to TRUE if IsGiven is TRUE, or the Kind argument has only one kind; otherwise, myKindIsGiven is set to FALSE (block 83).

Another inquiry is made as to whether or not there are any kinds common to myKind and the Kind argument (diamond 84). If the answer to this inquiry is yes, then myKind is set to the intersection of myKind and the Kind argument (block 85). Next, an inquiry is made as to whether or not myKindIsTaken and myKindIsGiven are both TRUE (diamond 86). If the answer to this inquiry is yes, then myKind is set to its bestKind (block 87). In either case, then the process is exited (bubble 82).

Referring back to the diamond 84, if the answer is no, then the Exp object is replaced with a kindCast object using the Exp object as its subexpression (block 88). Next, the Kind-Cast object's takeKind operation is called passing myKind and myKindIsTaken (block 89). Following this the process is exited (bubble 82).

Figure 6A:
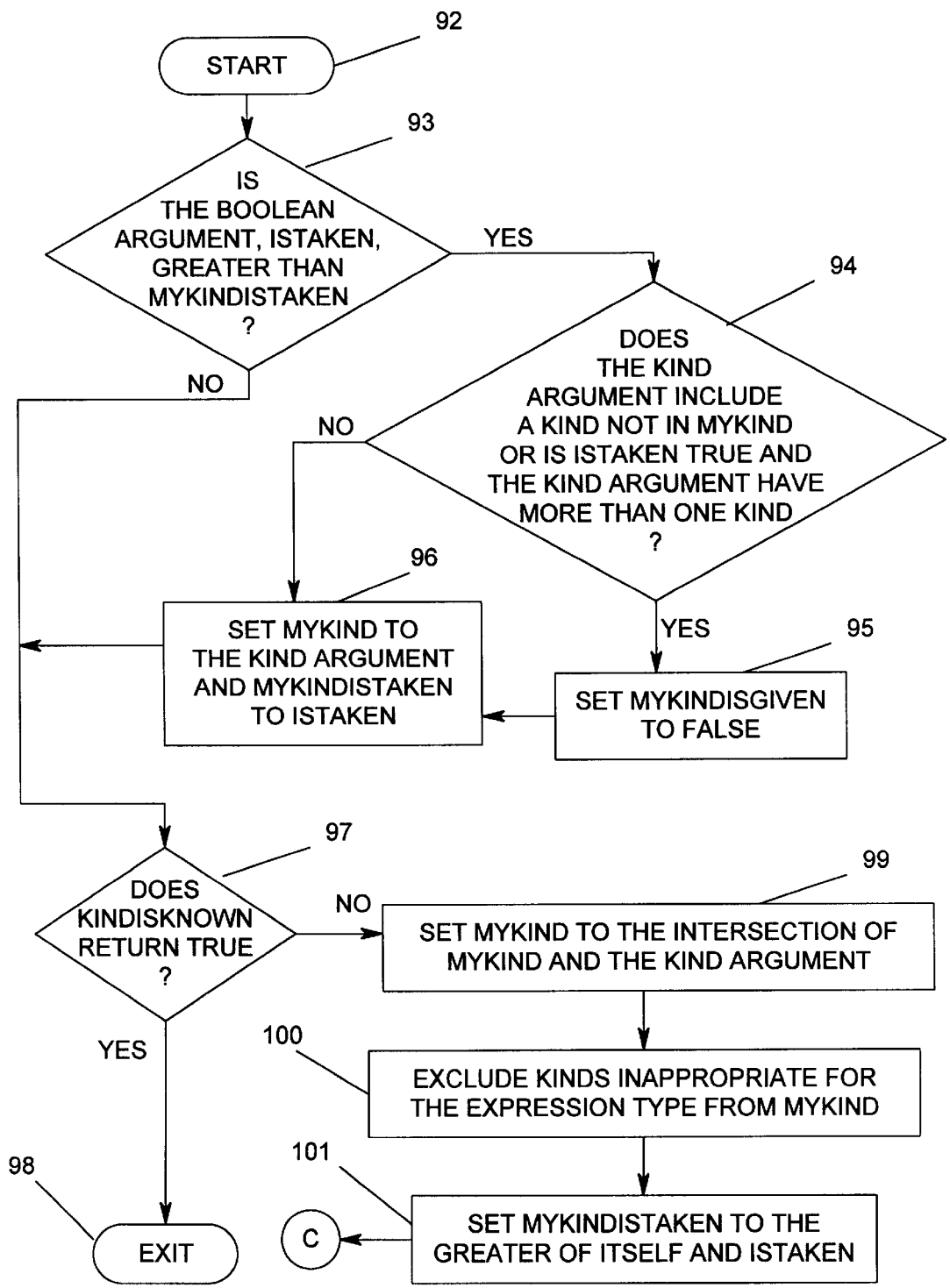
FIGS. 6A and 6B combined form a flow chart illustrating the method of the takeKind operation used by a KindCast object.
Figure 6B:
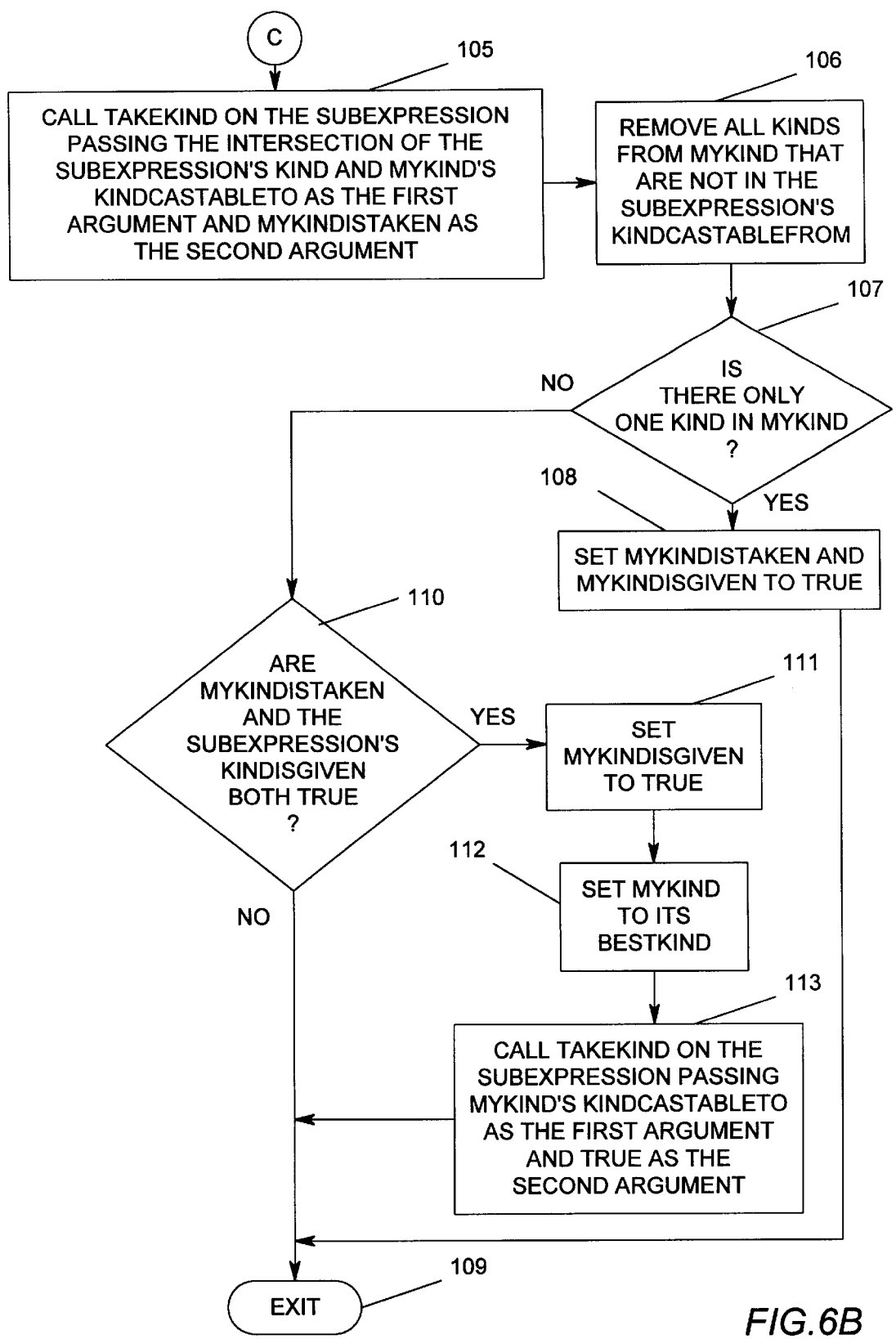

Referring now to FIGS. 6A and 6B, a flow chart illustrates the method of the takeKind operation used by a KindCast object. The process begins with a start bubble 92 followed by an inquiry as to whether or not the Boolean argument isTaken is grater than myKindIsTaken (diamond 93). If the answer to this inquiry is yes, then another inquiry is made as to whether or not the Kind argument includes a kind not in myKind or whether isTaken is TRUE and the Kind argument has more than one kind (diamond 94). If the answer to this inquiry is yes, then myKindIsGiven is set to FALSE (block 95). On the other hand, if the answer is yes or upon completion of the step depicted by the block 95, myKind is set to the Kind argument and myKindIsTaken is set to isTaken (block 96).

If the answer to the inquiry depicted by the diamond 93 is no, or upon completion of the step depicted by the block 96, yet another inquiry is made as to whether or not kindIsKnown returns TRUE (diamond 97). If the answer to this inquiry is yes, then the process is exited (bubble 98). On the other hand, if the answer is no, then myKind is set to the intersection of myKind and the Kind argument (block 99). Next, kinds inappropriate for the expression type are excluded from myKind (block 100). Following this, myKindIsTaken is set to the greater of itself and isTaken (block 101). The process illustration continues in the next sheet of the drawings in FIG. 6B as depicted by a connector C.

Referring now to FIG. 6B at the connector C, takeKind on the subexpression is called passing the intersection of the subexpression's kind and myKind's kindCasTableTo as the first argument and myKindIsTaken as the second argument (block 105). Next, all kinds are removed from myKind that are not in the subexpression's kindCasTableFrom (block 106). Following this, an inquiry is made as to whether or not there is only one kind in myKind (diamond 107). If the answer to this inquiry is yes, then myKindIsTaken is set to TRUE (block 108) and the process is exited (bubble 109). On the other hand, if the answer is no, then still another inquiry is made as to whether or not myKindIsTaken and the subexpression's kindIsGiven are both TRUE (diamond 110).

If the answer to the inquiry depicted by the diamond 110 is no, then the process is exited (bubble 109). On the other hand, if the answer is yes, then myKindIsGiven is set to TRUE (block 111). Next, myKind is set to its bestKind (block 112), and takeKind is called on the subexpression passing myKind's kindCasTableTo as the first argument and true as the second argument (block 113). Following this, the process is exited (bubble 109).

Figure 7:
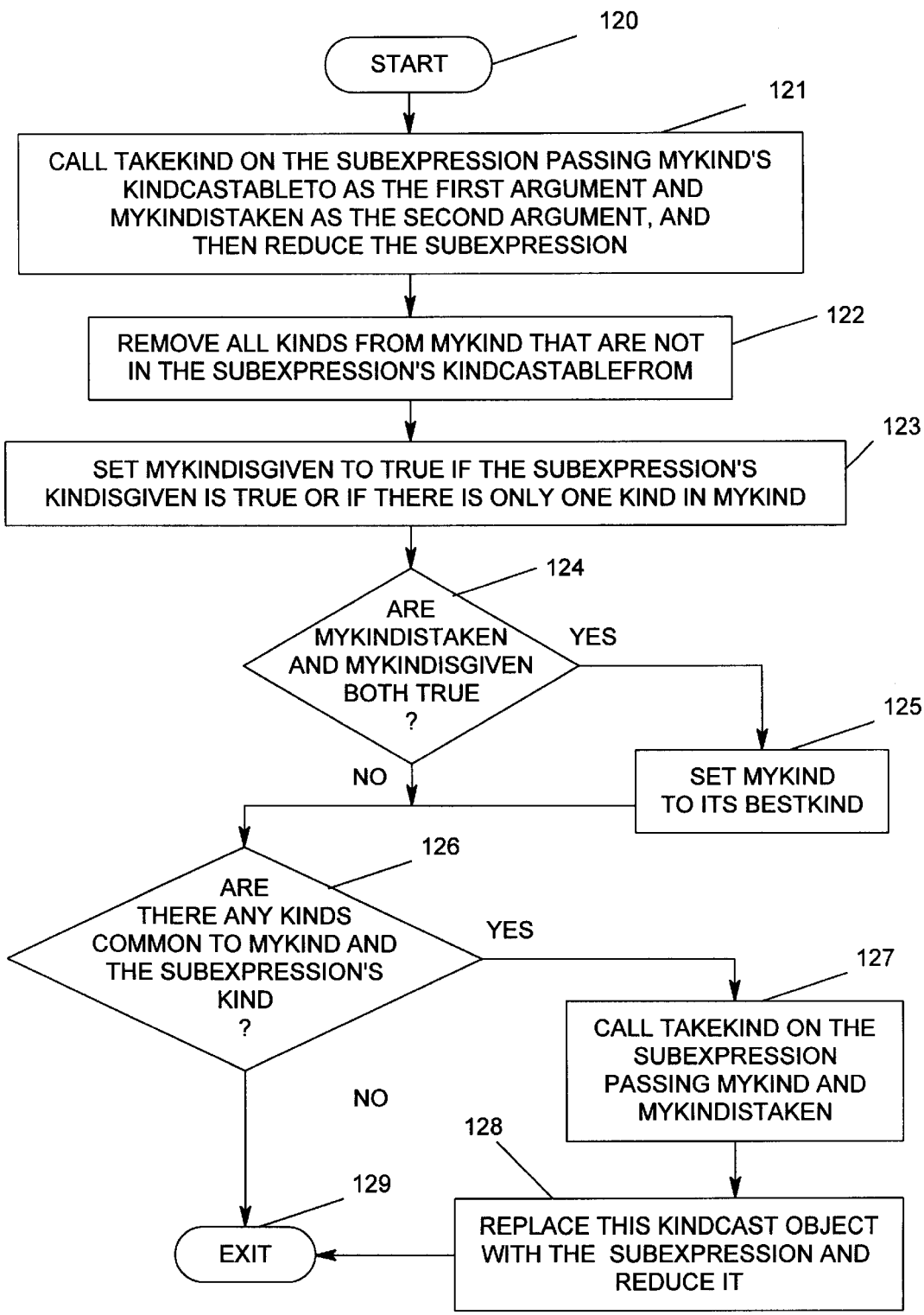
FIG. 7 is a flow chart illustrating the method of the reduce operation used by a KindCast object.

Referring now to FIG. 7, a flow chart illustrates the method of the reduce operation used by a KindCast object. The process begins with a start bubble 120 followed by a process step of calling takeKind on the subexpression passing myKind's kindCastableTo as the first argument and myKindIsTaken as the second argument, and then reducing the subexpression (block 121). Next, all kinds are removed from myKind that are not in the subexpression's kindCastableFrom (block 122). Following this, myKindIsGiven is set to TRUE if the subexpression's kindIsGiven is TRUE or if there is only one kind in myKind (block 123).

An inquiry is next made as to whether or not myKindIsTaken and myKindIsGiven are both TRUE (diamond 124). If the answer to this inquiry is yes, then myKind is set to its bestKind (block 125). If the answer to this inquiry is no, or upon completion of the step depicted by the block 125, another inquiry is made as to whether or not there are any kinds common to myKind and the subexpression's kind (diamond 126). If the answer to this inquiry is yes, then takeKind is called on the subexpression passing myKind and myKindIsTaken (block 127) and this KindCast object is replaced with the subexpression which is then reduced (block 128). If the answer to the inquiry depicted by the diamond 126 is no, or upon completion of the step depicted by the block 128, the process is exited (bubble 129).

Figure 8:
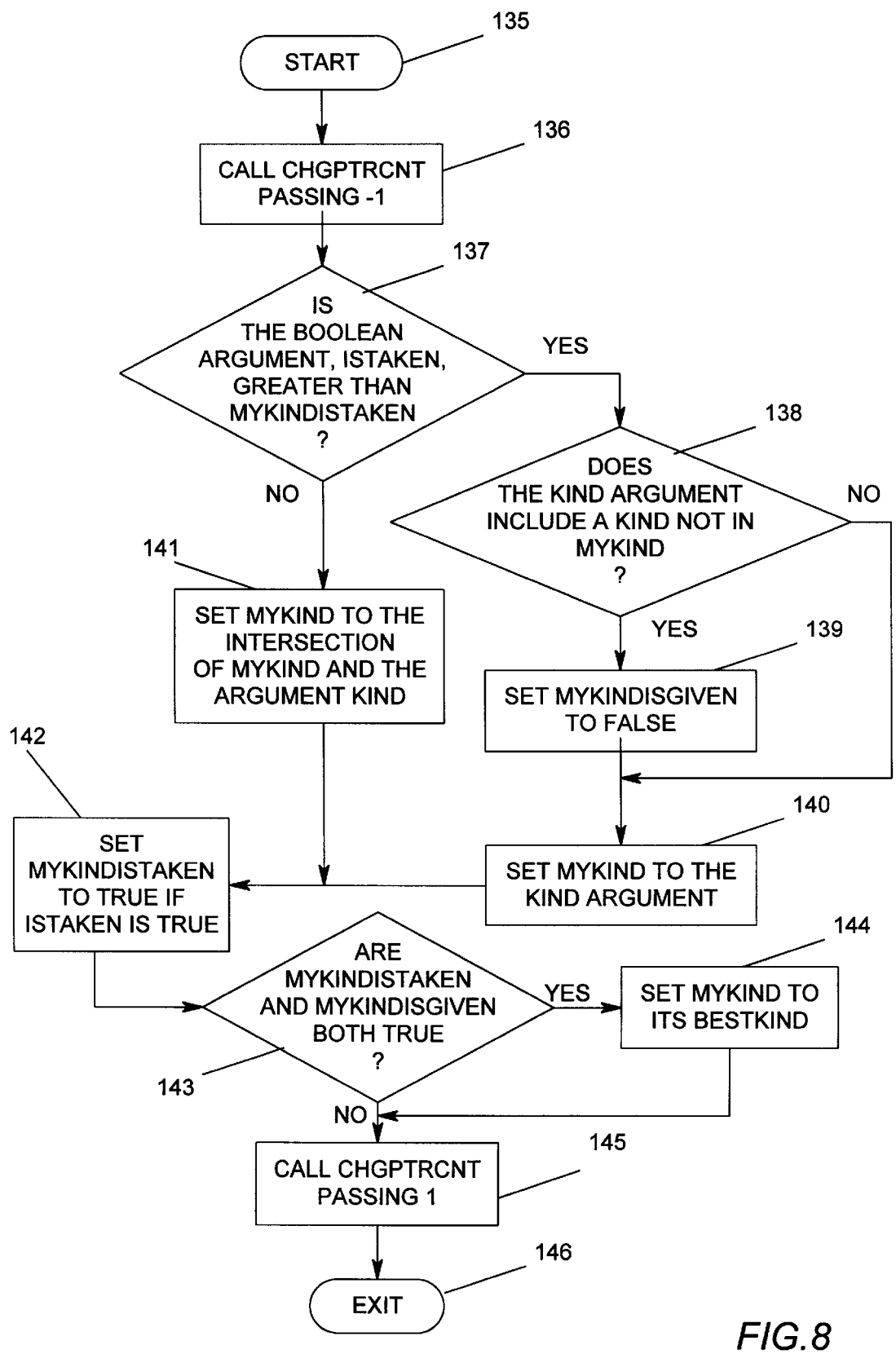
FIG. 8 a flow chart illustrating the method of the takeKind operation used by a VarPtr object.

Referring now to FIG. 8, a flow chart depicts the method of the takeKind operation used by a VarPtr object. The process begins with a start bubble 135 followed by a process step of calling chgPtrCnt passing a minus one (block 136). Next, an inquiry is made as to whether or not the Boolean argument, isTaken, is greater than myKindIsTaken (diamond 137). If the answer to this inquiry is yes, then another inquiry is made as to whether or not the kind argument includes a kind not in myKind (diamond 138). If the answer to this inquiry is yes, then myKindIsGiven is set to FALSE (block 139). Following this, or if the answer to diamond 138 is no, myKind is set to the kind argument (block 140).

If the answer to the inquiry in the diamond 137 is no, then myKind is set to the intersection of myKind and the argument kind (block 141). Upon completion of this step, or the step depicted by the block 140, then myKindIsTaken is set to TRUE if isTaken is TRUE (block 142). Next, still another inquiry is made as to whether or not myKindIsTaken and myKindIsGiven are both TRUE (diamond 143). If the answer to this inquiry is yes, then myKind is set to its bestKind (block 144). On the other hand if the answer is no, or upon completion of the step depicted by the block 144, chgPtrCnt is called passing a plus one (block 145). Finally, the process is exited (bubble 146).

Figure 9:
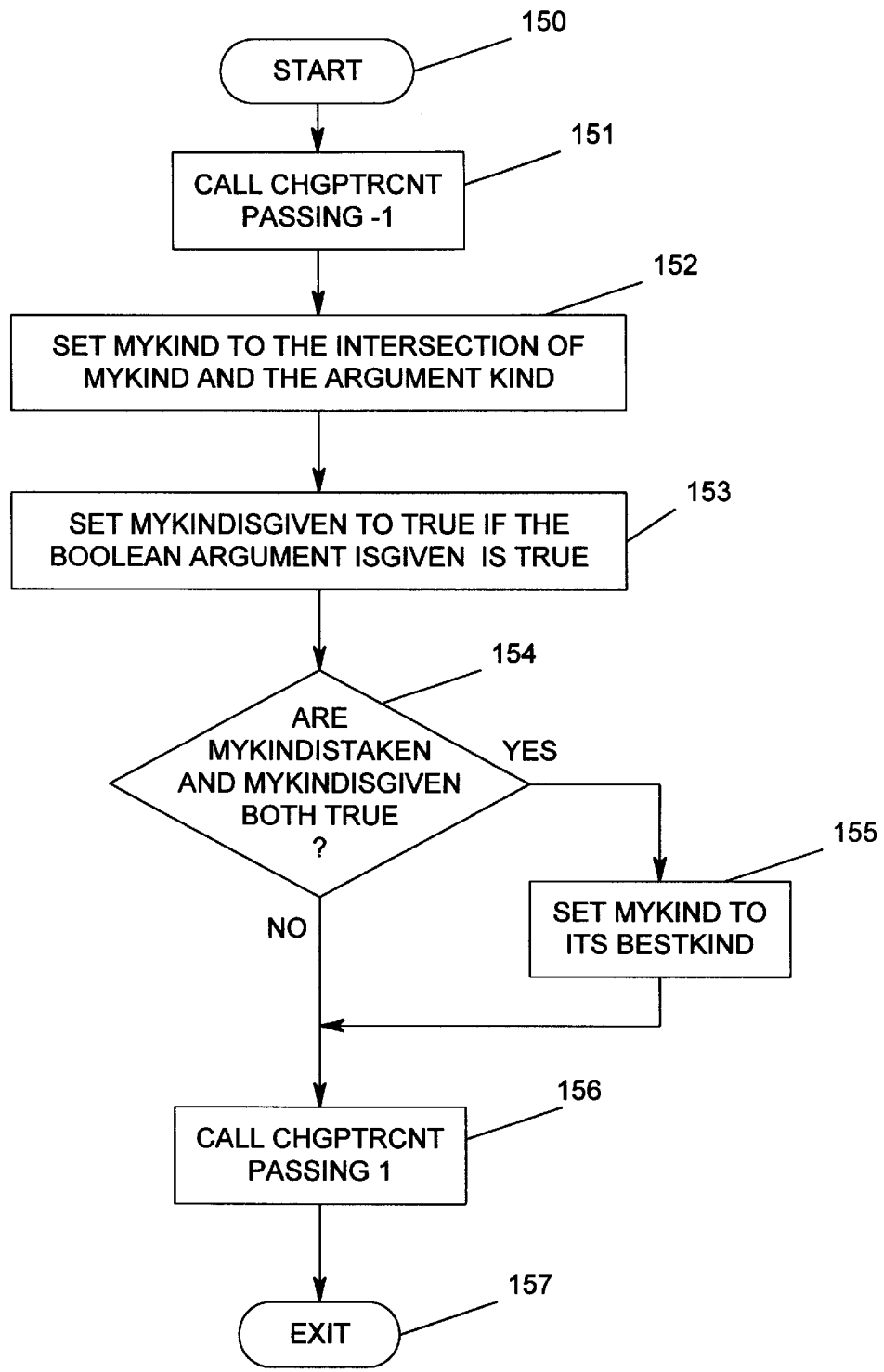
FIG. 9 is a flow chart illustrating the method of the giveKind operation used by a VarPtr object.

Referring now to FIG. 9, a flow chart illustrates the method of the giveKind operation used by a VarPtr object. The process begins with a start bubble 150 followed by a process step of calling chgPtrCnt passing a minus one (block 151). Next, myKind is set to the intersection of myKind and the argument kind (block 152). Following this, myKindIsGiven is set to TRUE if the Boolean argument isGiven is TRUE (block 153). An inquiry is next made as to whether or not myKindIsTaken and myKindIsGiven are both TRUE (diamond 154). If the answer to this inquiry is yes, then myKind is set to its bestKind (block 155). If the answer to this inquiry is no, or upon completion of the step depicted by the block 155, chgPtrCnt is called passing a plus one (block 156) and the process is exited (bubble 157).

The details below show an application of the invention applied to code generation targeted for an A Series computer system manufactured by Unisys Corporation, assignee of this patent. The choice of a particular target computer system determines the possible pointer kinds, types of variable allocation, restrictions imposed by pointer kinds on variable allocation, and possible conversions between pointer kinds.

There are several pointer kinds supported by the Unisys A Series computer processor, which are described below. These pointer kinds are independent of this invention but are explained herein for the purpose of showing the applicability of the invention to a particular target processor.

a. kindAc is an address couple, which is a stack address that can appear only in a code stream. It has two parts, both of which are constant. The first is the stack level and the second is the offset into the frame for the level, which refers only to stack frames of the current program.

b. kindWref is an indirect reference word, which can be a stuffed indirect reference word built from an address couple (so it points into a stack), an indexed single data descriptor for a one word type, or an indexed double data descriptor for a double word type. A kindWref pointer can point at data across process and program boundaries. In general, it can occur only in the program stack. It cannot occur as a constant in the code stream nor in the program's address space.

c. kindIbdd is an indexed byte data descriptor (8-bit). It points at a byte in an array. It can point into the program's address space. It can also point at constant pools and at data across process and program boundaries. It can occur only in the program stack. It cannot occur as a constant in the code stream nor in the program's address space.

d. kindIsdd is an indexed single data descriptor. It is identical to kindIbdd except that it points at a full word as is always aligned on a word boundary.

e. kindIddd is an indexed double data descriptor. It is identical to kindIsdd except that it points at a double word.

f. kindAddr is an integer address in the program's address space. The address space is an array. A kindAddr pointer is a byte offset into the address space array.

g. kindDeref is a de-referenced value from the pointer. This pointer kind is used for a pointer expression where the value pointed at, and not the pointer itself, is the intended result.

h. kindSop is a source operand for transfer and compare operations on sequences of bytes. It is effectively the same as kindDeref, but the data is left justified within a word or double word. It is generally used as a more efficient alternative to kindIbdd for short transfers and comparisons.

The method and apparatus of the present invention are equally applicable to any other set of pointer kinds for any other target processor. Application of the present invention to a different set of kinds for a different target processor uses the same types and steps described above, but with obvious differences in the methods for operations that depend on the properties of pointer kinds.

There can be any number of subtypes of Exp, depending on the language being compiled. The reduce method of each subtype that has a pointer subexpression must call takeKind and reduce on the subexpression. The reduce method of each subtype that yields a pointer must call giveKind. The reduce methods of several subtypes of Exp are given as examples below:

1. PtrEqual, a subtype of Exp, represents the comparison of two pointer subexpressions for equality. The only pointer kind suitable for comparison is kindAddr. Therefore, the reduce method for PtrEqual calls takeKind passing kindAddr and TRUE, and then calls reduce on both subexpressions.

2. PtrAdd, a subtype of Exp, represents the addition of an integer offset to a pointer. A PtrAdd object has two subexpressions, one yielding a pointer and the other an integer. If the integer is a constant zero, the reduce method can replace the PtrAdd object with the pointer subexpression. Otherwise, the method calls takeKind on the pointer subexpression passing kindAddr and TRUE. The method calls reduce on both subexpressions, and then calls giveKind passing kindAddr. If kindAddr is not one of the kinds previously passed to takeKind for the PtrAdd object, giveKind will insert a KindCast object to convert the kindAddr pointer to a kind that is taken.

3. IntAssign, a subtype of Exp, represents an assignment of an integer value to a location designated by a pointer. An IntAssign object has two subexpressions, one yielding a pointer and the other an integer. In some cases, the IntAssign must yield the value or de-referenced value of the pointer subexpression as a result. Therefore, the reduce method of IntAssign must consider what kinds are taken, if any, when choosing what kind to take from the pointer subexpression. The table below shows what kinds the reduce method can take from the pointer subexpression. The second argument to takeKind on the subexpression is the value of myKindIsTaken. After calling takeKind on the pointer subexpression, the method calls reduce on both subexpressions and then it calls giveKind passing the kind of the pointer subexpression plus kindDeref as the first argument, and the pointer subexpression's kindIsGiven as the second argument. This is a typical case of an expression operation that can return a pointer used by the operation. Note that kinds in the table's second column are the most efficient kinds for the assignment operation that either match or can be cast into kinds in the first column.

| Kind taken from IntAssign | Kind taken from subexpression |
| --- | --- |
| kindAc | kindAc |
| kindWref, kindDeref, kindSop, none | kindAc, kindWref |
| kindIbdd, kindIsdd, kindIddd | kindIsdd |
| kindAddr | kindAddr |

4. PtrAssign, a subtype of Exp, is identical to IntAssign except that its second subexpression yields a pointer rather than an integer. Pointers are stored as addresses, so PtrAssign's reduce method must call takeKind on the second subexpression passing kindAddr and TRUE before the second subexpression is reduced. The reduce method is the same as that of IntAssign in all other respects.

The invention is demonstrated with a simple example. The source program below uses the C programming language.

```
void main ()
{int *p, *q, a, b;
p = q = &b;
*p = 1;
a =* q;
b = 2;}
```

Now referring to FIG. 2, a compiler parses the source program to create Var objects for the four variables (block 41) and Exp objects for the four expressions and their subexpressions (block 42). The Var objects are shown in the first table below with counters reflecting the references to the Var objects in the Exp objects. The Exp objects are shown in the second table below with default initial values for kind, kindIsTaken and kindIsGiven. Subexpressions are indented under their owning expressions.

| Var | valueCnt | WrefCnt | IddCnt | AddrCnt | Type of Allocation |
| --- | --- | --- | --- | --- | --- |
| p | 1 | 0 | 0 | 1 | unknown |
| q | 1 | 0 | 0 | 1 | unknown |
| a | 0 | 0 | 0 | 1 | unknown |
| b | 0 | 0 | 0 | 2 | unknown |

| Exp subtype | kind | kindIs-Taken | kindIs-Given |
| --- | --- | --- | --- |
| PtrAssign (p = q = &b) | none | | |
| . VarPtr (p) | all | FALSE | FALSE |
| . PtrDeref | all | FALSE | FALSE |
| . . PtrAssign (q = &b) | all | FALSE | FALSE |
| . . . VarPtr (q) | all | FALSE | FALSE |
| . . . VarPtr (b) | all | FALSE | FALSE |
| IntAssign (*p = 1) | none | | |
| . VarValue (p) | all | FALSE | FALSE |
| . Constant (1) | none | | |
| IntAssign (a = *q) | none | | |
| . VarPtr (a) | all | FALSE | FALSE |
| . PtrDeref (*q) | none | | |
| . . VarValue (q) | all | FALSE | FALSE |
| IntAssign (b = 2) | none | | |
| . VarPtr (b) | all | FALSE | FALSE |
| . Constant (2) | none | | |

As shown in the next table, after the first reduction of the expressions (block 43) the Exp objects have only kinds that can be taken by the operations that use their results. In some cases, Exp objects already know what kinds can be given. In two places, KindCast objects are inserted, because the subexpression does not give a kind that is taken.

| Exp subtype | kind | kindIs-Taken | kindIs-Given |
| --- | --- | --- | --- |
| PtrAssign (p = q = &b) | none | | |
| . VarPtr (p) | kindAc, kindWref | TRUE | FALSE |
| . PtrDeref | kindAddr | TRUE | TRUE |
| . . PtrAssign (q = &b) | kindDeref | TRUE | FALSE |
| . . . VarPtr (q) | kindAc, kindWref, kindIsdd | TRUE | FALSE |
| . . . VarPtr (b) | kinAddr | TRUE | FALSE |
| IntAssign (*p = 1) | none | | |
| . KindCast | kindWref | TRUE | TRUE |
| . . VarValue (p) | kindAddr | TRUE | TRUE |
| . Constant (1) | none | | |
| IntAssign (a = *q) | none | | |
| . VarPtr (a) | kindAc, kindWref | TRUE | FALSE |
| . PtrDeref (*q) | none | | |
| . . KindCast | kindDeref | TRUE | TRUE |
| . . . VarValue (q) | kindAddr | TRUE | TRUE |
| IntAssgn (b = 2) | none | | |
| . VarPtr (b) | kindAc, kindWref | TRUE | FALSE |
| . Constant (2) | none | | |

There is no function inlining (block 44) in this example. The Var objects' counters, which correspond to the kinds of references to the Var objects in the Exp objects, are used to determine how to allocate each variable (block 45) as shown in the table below. The variable b is the only one that must be allocated in the address space. The others can be allocated in the program stack, which allows faster access.

| Var | valueCnt | WrefCnt | IddCnt | AddrCnt | Type of Allocation |
| --- | --- | --- | --- | --- | --- |
| p | 1 | 1 | 0 | 0 | stack cell |
| q | 1 | 1 | 0 | 0 | stack cell |
| a | 0 | 1 | 0 | 0 | stack cell |
| b | 0 | 1 | 0 | 1 | address space |

The allocation types of the Var objects are used in the final reduction of the Exp objects (block 46). The table below shows the resulting pointer kinds. All pointer kinds are now known.

| Exp subtype | kind | kindIs-Taken | kindIs-Given |
|---|---|---|---|
| PtrAssign (p = q = &b) | none | | |
| . VarPtr (p) | kindAc | TRUE | TRUE |
| . PtrDeref | kindAddr | TRUE | TRUE |
| . . PtrAssign (q = &b) | kindDeref | TRUE | TRUE |
| . . . VarPtr (q) | kindAc | TRUE | TRUE |
| . . . VarPtr (b) | kindAddr | TRUE | TRUE |
| IntAssign (*p = 1) | none | | |
| . KindCast | kindWref | TRUE | TRUE |
| . . VarValue (p) | kindAddr | TRUE | TRUE |
| . Constant (1) | none | | |
| IntAssign (a = *q) | none | | |
| . VarPtr (a) | kindAc | TRUE | TRUE |
| . PtrDeref (*q) | none | | |
| . . KindCast | kindDeref | TRUE | TRUE |
| . . . VarValue (q) | kindAddr | TRUE | TRUE |
| IntAssign (b = 2) | none | | |
| . VarPtr (b) | kindWref | TRUE | TRUE |
| . Constant (2) | none | | |

All allocations and pointer kinds are known. The Var and Exp objects are now ready for generating machine instructions (block 47).

Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. It is therefore contemplated that the appended claims will cover any such modifications of embodiments that fall within the true scope of the invention.

What is claimed is:

1. A computer-implemented method for selecting optimal pointer kinds in a compiler during an operation of compiling a source program into machine instructions for a target computer, said method comprising the steps of:
   a. parsing said source program in order to create variable objects and expression objects including their sub-expression objects;
   b. reducing each of said expression objects a first time to determine the kinds of pointers that can be given as an expression result and the kinds of pointers that can be taken from each of said sub-expression objects;
   c. inlining calls on inline functions, including creating copies of each of said expression objects representing a function being inlined into the place of a call on said function and reducing said copies of expression objects to determine the kinds of pointers that can be given as an expression result and the kinds of pointers that can be taken from each of said sub-expression objects;
   d. determining storage allocation for variable objects based on kinds of pointers used;
   e. reducing each of said expression objects a final time, including inlined copies, thereby causing all pointer kinds to become known; and,
   f. generating machine instructions based on known kinds and allocations.

2. The method as in claim 1 further including a method for indicating to one of said expression objects which pointer kinds are acceptable to be taken for use.

3. The method as in claim 1 further including an initial step of determining whether or not Kind argument has only one kind, and if so, setting said Boolean argument IsTaken to TRUE.

4. The method as in claim 3 wherein it is determined that the Boolean argument IsTaken is greater than the instance variable MyKindIsTaken, further including the steps of:
   a. determining whether or not said Kind argument includes a kind not in MyKind or is IsTaken TRUE and said Kind argument has more than one kind, and if yes; and,
   b. setting MyKindIsGiven to FALSE.

5. The method as in claim 4 further including the step of setting MyKind to said Kind argument and MyKindIsTaken to IsTaken.

6. The method as in claim 2 wherein it is determined that there are kinds common to an instance variable myKind and a Kind argument, further including the steps of:
   a. setting MyKind to the intersection of MyKind and said Kind argument;
   b. setting an instance variable MyKindIsTaken to the greater of itself and an argument IsTaken;
   c. determining whether or not MyKindIsTaken and an instance variable MyKindIsGiven are both, and if so;
   d. setting MyKind to its best kind.

7. The method as in claim 1 further including an operation for indicating what pointer kinds can be given by an expression.

8. The method as in claim 7 further including the steps of:
   a. determining whether or not instance variables MyKindIsTaken and MyKindIsGiven, and a Boolean argument IsGiven are all TRUE, and if yes;
   b. exiting said method.

9. The method as in claim 8 wherein it is determined in step a that one is not TURE, further including the steps of:
   a. setting MyKindIsGiven to TRUE if IsGiven is TRUE or if only one argument Kind is given, otherwise set MyKindIsGiven to FALSE;
   b. determining whether or not there are any kinds common to an instance variable MyKind and said Kind argument, and if yes;
   c. setting MyKind to the intersection of MyKind and said Kind argument;
   d. determining whether or not MyKindIsTaken and MyKindIsGiven are both TRUE, and if yes;
   e. setting MyKind to its best kind.

10. The method as in claim 9 wherein it is determined that there are no kinds common to MyKind and said Kind argument, further including the steps of:
    a. replacing said expression object with a KindCast object using said expression object as its subexpression; and,
    b. calling TakeKind on said KindCast object passing MyKind and MyKindIsTaken.

11. The method as in claim 1 wherein said step of inlining calls further comprises:
    a. copying objects representing a function being inlined into place of a call on said function; and,
    b. reducing expression objects copied in the preceding step.

12. The method as in claim 1 further including a method for indicating to one of said expression objects that specifically represents casting a pointer from one kind to another kind, which pointer kinds are acceptable to be taken for use, further including:

a. determining whether or not a Boolan argument IsTaken is greater than an instance variable MyKindIsTaken, and if not;
b. determining whether or not MyKindIsTaken and another instance variable MyKindIsGiven both return true, and if yes; and,
c. exiting said method.

13. The method as in claim 12 where the answer to the inquiry in step a is yes, further including the steps of:
   a. determining whether or not Kind argument includes a kind not in an instance variable MyKind or is IsTaken TRUE and said Kind argument has more than one kind, and if yes;
   b. setting MyKindIsGiven to FALSE; and,
   c. setting MyKind to said Kind argument and MyKindIsTaken to IsTaken.

14. The method as in claim 12 where the answer to the inquiry in step b is no, further including the steps of:
   a. setting MyKind to the intersection of MyKind and said Kind argument;
   b. excluding kinds inappropriate for said expression's type from MyKind;
   c. setting MyKindIsTaken to the greater of itself and IsTaken;
   d. calling TakeKind on said subexpression passing the intersection of said subexpression's kind and MyKind's KindCasTableTo as a first argument and MyKindIsTaken as a second argument;
   e. removing all kinds from MyKind that are not in said subexpression's KindCasTableFrom;
   f. determining whether or not there is only one kind in MyKind and if not;
   is g. determining whether or not MyKindIsTaken and said subexpression's KindIsGiven are both TRUE, and if not;
   h. exiting said method.

15. The method as in claim 14 where the answer to the inquiry in step f is yes, further including the step of setting MyKindIsTaken and MyKindIsGiven to TRUE.

16. The method as in claim 14 where the answer to the inquiry in step g is yes, further including the steps of:
   a. setting MyKindIsGiven to TRUE;
   b. setting MyKind to its best kind; and,
   c. calling TakeKind on said subexpression passing MyKind's KindCasTableTo as a first argument and TRUE as a second argument.

17. The method as in claim 1 wherein reducing includes a specific method for one of said expression objects that specifically represents casting a pointer from one kind to another kind, further including the steps of:
   a. calling TakeKind on a subexpression passing MyKind's KindCasTableTo as a first argument and MyKindIsTaken as a second argument and reducing said subexpression;
   b. removing all kinds from MyKind that are not in said subexpression's KindCasTableFrom;
   c. setting MyKindIsGiven to TRUE if said subexpression's KindIsGiven is TRUE or if there is only one kind in MyKind;
   d. determining whether or not MyKindIsTaken and MyKindIsGiven are both TRUE, and if not;
   e. determining whether or not there are any kinds common to MyKind and said subexpression's kind, and if not; and,
   f. exiting said method.

18. The method as in claim 17 where the answer to the inquiry in step d is yes, further including the step setting MyKind to its best kind.

19. The method as in claim 17 where the answer to the inquiry in step e is yes, further including the steps of:
   a. calling TakeKind on said subexpression passing MyKind and MyKindIsTaken; and,
   b. replacing this KindCast object with said subexpression and reducing it.

20. The method as in claim 1 further including a method for takeKind on an expression object representing a pointer to a variable.

21. The method as in claim 20 further including the steps of:
   a. determining whether or not an argument IsTaken is greater than an instance variable MyKindIsTaken, and if not;
   b. setting an instance variable MyKind to the intersection of MyKind and an argument Kind;
   c. setting MyKindIsTaken to TRUE if IsTaken is TRUE;
   d. determining whether or not MyKindIsTaken and an instance variable MyKindIsGiven are both TRUE, and if not;
   e. exiting the method.

22. The method as in claim 21 where the answer to the inquiry in step a is yes, further including the steps of:
   a. determining whether said Kind argument includes a kind not in MyKind, and if no; and,
   b. setting MyKind to said Kind argument.

23. The method as in claim 22 where the answer to the inquiry in step a is yes, further including the step of setting MyKindIsGiven to FALSE.

24. The method as in claim 21 where the answer to the inquiry in step d is yes, further including the step of setting MyKind to its best kind.

25. The method as in claim 1 further including the step of defining a method for giveKind.

26. The method as in claim 25 further including the steps of:
   a. setting an instance variable MyKind to the intersection of MyKind and an argument Kind;
   b. setting an instance variable MyKindIsGiven to TRUE if an argument IsGiven is TRUE;
   c. determining whether an instance variable MyKindIsTaken and MyKindIsGiven are both TRUE, and if not;
   d. exiting said method.

27. The method as in claim 26 where the answer to the inquiry in step c is yes, further including the step of setting MyKind to its best kind.

* * * * *